United States Patent
Kocherovsky et al.

(10) Patent No.: US 8,985,916 B2
(45) Date of Patent: Mar. 24, 2015

(54) FLEXIBLE CARTRIDGE WITH PRECISION ADJUSTMENT

(75) Inventors: Yevgeny Kocherovsky, West Bloomfield, MI (US); Gregor Weber, Lake Orion, MI (US); Curt Holbrook, Goodrich, MI (US)

(73) Assignee: Sandvik Intellectual Property AB, Sandviken (SE)

( * ) Notice: Subject to any disclaimer, the term of this patent is extended or adjusted under 35 U.S.C. 154(b) by 268 days.

(21) Appl. No.: 13/235,830

(22) Filed: Sep. 19, 2011

(65) Prior Publication Data
US 2013/0071193 A1   Mar. 21, 2013

(51) Int. Cl.
*B23B 29/03* (2006.01)
*B23B 29/034* (2006.01)
*B25B 23/142* (2006.01)

(52) U.S. Cl.
CPC ....... *B23B 29/0341* (2013.01); *Y10T 29/49716* (2015.01); *Y10T 407/2222* (2015.01); *B25B 23/142* (2013.01); *B23B 2260/056* (2013.01)
USPC ................ 408/154; 407/39; 407/46; 408/181

(58) Field of Classification Search
CPC .............. B23B 29/03; B23B 29/03407; B23B 29/0341; B23B 29/03417
USPC ........ 408/153–155, 181, 185; 407/46, 36–39; 362/119, 120
See application file for complete search history.

(56) References Cited

U.S. PATENT DOCUMENTS

| | | | | |
|---|---|---|---|---|
| 2,998,737 A * | 9/1961 | Yogus et al. | ................... | 408/153 |
| 3,102,441 A * | 9/1963 | Milewski | ....................... | 408/146 |
| 3,195,376 A * | 7/1965 | Bader | ........................... | 408/146 |
| 3,236,125 A * | 2/1966 | Lundgren | ..................... | 408/197 |
| 3,427,904 A | 2/1969 | Arendt | | |
| 3,755,868 A * | 9/1973 | LaForge et al. | .................. | 407/75 |
| 4,040,156 A * | 8/1977 | Tack | ............................... | 407/44 |
| 4,428,704 A * | 1/1984 | Kalokhe | ........................ | 408/156 |
| 4,547,100 A * | 10/1985 | Naccarato et al. | ............... | 407/39 |

(Continued)

FOREIGN PATENT DOCUMENTS

| | | | | |
|---|---|---|---|---|
| DE | 2625983 A1 * | 12/1977 | ........ | B23B 29/03407 |
| DE | 3026513 A1 * | 1/1982 | ........ | B23B 29/03417 |

(Continued)

OTHER PUBLICATIONS

European Search Report, for Application No. 12182803.2 , dated Dec. 7, 2012.

*Primary Examiner* — Daniel Howell
*Assistant Examiner* — Ryan Rufo
(74) *Attorney, Agent, or Firm* — Morgan, Lewis & Bockius LLP

(57) ABSTRACT

A tool cartridge for a material removal tool has a cartridge body with, among other things, a recess extending through at least a portion of the cartridge body from a first side toward a second side, a long axis of the recess non-parallel to a long axis of the cartridge body and at least a portion of the recess open to a bottom side of the cartridge body, and a threaded opening for a differential screw proximate a second end of the tool body and positioned longitudinally between an opening for a clamping screw and at least a portion of a seat for a cutting tool insert. A thread axis of the threaded opening is at an angle G relative to a long axis of the tool cartridge. A material removal tool, a tool, and a method of adjusting a cutting tool insert are also disclosed.

20 Claims, 12 Drawing Sheets

(56) References Cited

U.S. PATENT DOCUMENTS

| | | | |
|---|---|---|---|
| 4,692,069 A * | 9/1987 | Kieninger | 407/39 |
| 4,786,217 A * | 11/1988 | Johne | 408/156 |
| 4,878,787 A * | 11/1989 | Hunt | 408/181 |
| 5,066,173 A | 11/1991 | Gaffan et al. | |
| 5,709,510 A * | 1/1998 | Scheer | 408/156 |
| 7,108,395 B2 * | 9/2006 | Correa | 362/191 |
| 7,753,626 B2 | 7/2010 | Musil et al. | |
| 7,993,023 B2 * | 8/2011 | Wang | 362/119 |
| 8,118,444 B2 * | 2/2012 | Nevin | 362/119 |
| 2006/0140730 A1 * | 6/2006 | Schlagenhauf et al. | 407/37 |
| 2007/0084320 A1 * | 4/2007 | Frank et al. | 82/158 |
| 2009/0279963 A1 * | 11/2009 | D'Andrea | 407/45 |
| 2011/0188951 A1 * | 8/2011 | Mergenthaler | 407/44 |

FOREIGN PATENT DOCUMENTS

| | | | |
|---|---|---|---|
| DE | 3807542 A1 * | 9/1989 | B23B 29/03 |
| DE | 294 207 | 9/1991 | |
| DE | 19649143 A1 * | 6/1997 | B23B 29/03 |
| DE | 102 16 538 | 7/2003 | |
| GB | 2 450 879 | 1/2009 | |
| GB | 2 457 578 | 8/2009 | |
| JP | 63-186507 | 11/1988 | |
| JP | 3-87506 | 9/1991 | |
| JP | 2003-25120 | 1/2003 | |
| JP | 2003-025120 A * | 1/2003 | B23B 29/03 |

* cited by examiner

FLEXIBLE CARTRIDGE WITH PRECISION ADJUSTMENT

FIELD

The present disclosure relates to cutting tools, in particular for cutting metals, and, more particularly, to a tooling cartridge that combines structural and engineering features to provide an interface for precision machining. The tooling cartridge includes a precision adjustment mechanism generally based on the merged functions of a differential screw and a wedge mechanism and provides a cutting force support in optimal domain, which reduces or eliminates backlash in the adjustment loop and imparts a stress control to the system.

BACKGROUND

In the discussion of the background that follows, reference is made to certain structures and/or methods. However, the following references should not be construed as an admission that these structures and/or methods constitute prior art. Applicant expressly reserves the right to demonstrate that such structures and/or methods do not qualify as prior art.

Conventional tool cartridges, particularly ISO tool cartridges, for finish operations have a tool cartridge with a screw to bear against a cutting insert to hold it in a desired seated position for machining operations. FIG. 1A shows an example of a conventional, "screw down" tool cartridge 10. In the conventional tool cartridge 10, radial adjustment, i.e., in the Y-axis direction in FIG. 1A, is performed by a socket set screw (not shown) positioned in threaded opening 12 (threaded opening 12 is illustrated in cut-away view for ease of viewing). On one end of the screw there is a driving hex hole to engage with a wrench having a suitable mating shape, as is conventional. The other end of the screw has, depending on the quality of the tooling cartridge, a polished ball or oval surface (in high end designs) or a simple flat surface (in inexpensive versions).

The conventional tool cartridge 10 has a body 14 that represents an essentially ridged structure. In use and to raise a vertex 16 of the cutting insert 18, one of two possibilities have to be executed: 1) a clamping screw has to be loosen, an adjustment performed, a clamp screw tighten, the adjustment should be checked and any correction made before the process is completed; or 2) a clamping screw has to be pre-tightened arbitrarily to allow the clamping screw to stretch enough to provide an adjustment range. Both methods 1) and 2) are criticized by typical machinists on the shop floor.

Another problem of the conventional design is a negative gain of resolution. FIG. 1B shows a line drawing of the conventional tool cartridge 10 from FIG. 1A. In FIG. 1B, a typical axial location of the threaded opening 12 for an adjustment screw is illustrated. The conventional tool cartridge 10 shown has a ratio of an adjustment screw distance (L1) to a vertex cutting edge distance (L2) of about 1:1.5. This means that a small radial movement of the adjustment screw in the threaded opening 12 will be amplified 1.5 times on the cutting edge located at the vertex 16. For reference, the axial direction is the X-axis direction in FIGS. 1A and 1B.

A further problem of the conventional design is a high expansion stress of the clamping screw 20, which is stretched by adjustment, and the high compression stress of the adjustment screw, which is trying to bend the rigid structure of cartridge body 14. Neither stress state is ideal.

U.S. Pat. No. 5,066,173 describes a boring bar in which a slot with a recess is introduced into the boring bar to allow the front of the cartridge to be flexible enough to reduce the stress on the clamping screw as well as on the adjustment screw. However, the disadvantage of this design is the low resolution of adjustment as it depends solely on the thread pitch of the screw and the adjustment screw resides in the cutter body (and not within the cartridge itself).

U.S. Pat. No. 7,753,626 discloses a cartridge that has a differential screw mechanism. However, the cartridge does not address the cantilever problem and the clamping screw problem discussed above.

SUMMARY

Advantages of embodiments of the disclosed adjustment arrangement include, but are not limited by, one or more of the following: 1) high resolution of adjustment, which is improved by an introduced angle between a centroid axis of the adjustment mechanism and a long axis of the cartridge body during adjustment; 2) transverse of adjustment contact domain further forward under cutting edge to realize a longer lever and reduce cantilever; 3) better support against cutting force and reduce contact stress in adjustment mechanism; 4) reduced stress in the clamping screw; and 5) easier access to the adjustment screw and simplified adjustment procedure.

In additional embodiments, simplifying manufacturing of adjustment kit adjacent threads is manufactured using combination of standard metric and imperial threads. This is given a great economical effect to employ close but different pitches based on close diameters without specifying non-standard threads.

An exemplary embodiment of a tool cartridge for a material removal tool comprises a cartridge body, an axial adjustment screw at a first end of the cartridge body, an opening for a clamping screw proximate the first end of the cartridge body, a seat for a cutting tool insert at a second end of the cartridge body, a recess extending through at least a portion of the cartridge body from a first side toward a second side, a long axis of the recess non-parallel to a long axis of the cartridge body and at least a portion of the recess open to a bottom side of the cartridge body, and a threaded opening for a differential screw proximate the second end and positioned longitudinally between the opening for the clamping screw and at least a portion of the seat, wherein a thread axis of the threaded opening for the differential screw is at an angle G relative to a long axis of the cartridge body.

An exemplary embodiment of a material removal tool comprises a body and a plurality of tool cartridges. The tool cartridges comprises a cartridge body, an axial adjustment screw at a first end of the cartridge body, an opening for a clamping screw proximate the first end of the cartridge body, a seat for a cutting tool insert at a second end of the cartridge body, a recess extending through at least a portion of the cartridge body from a first side toward a second side, a long axis of the recess non-parallel to a long axis of the cartridge body and at least a portion of the recess open to a bottom side of the cartridge body, and a threaded opening for a differential screw proximate the second end and positioned longitudinally between the opening for the clamping screw and at least a portion of the seat, wherein a thread axis of the threaded opening for the differential screw is at an angle G relative to a long axis of the cartridge body.

It is to be understood that both the foregoing general description and the following detailed description are exemplary and explanatory and are intended to provide further explanation of the invention as claimed.

BRIEF DESCRIPTION OF THE DRAWING

The following detailed description can be read in connection with the accompanying drawings in which like numerals designate like elements and in which.

DETAILED DESCRIPTION

Figure 1A:
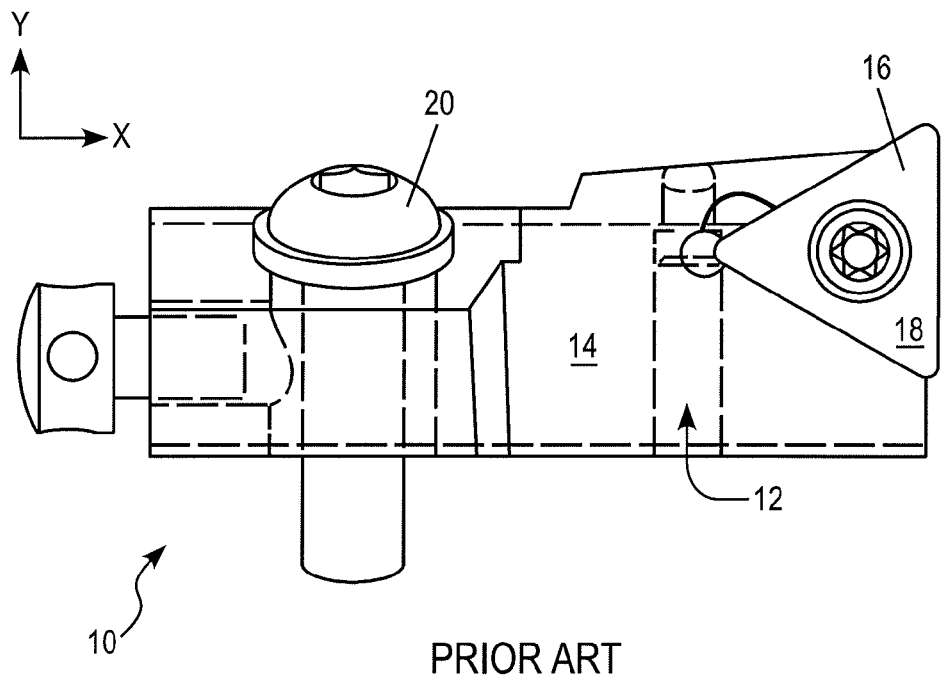
FIGS. 1A and 1B show a conventional "screw down" tool cartridge.
Figure 1B:
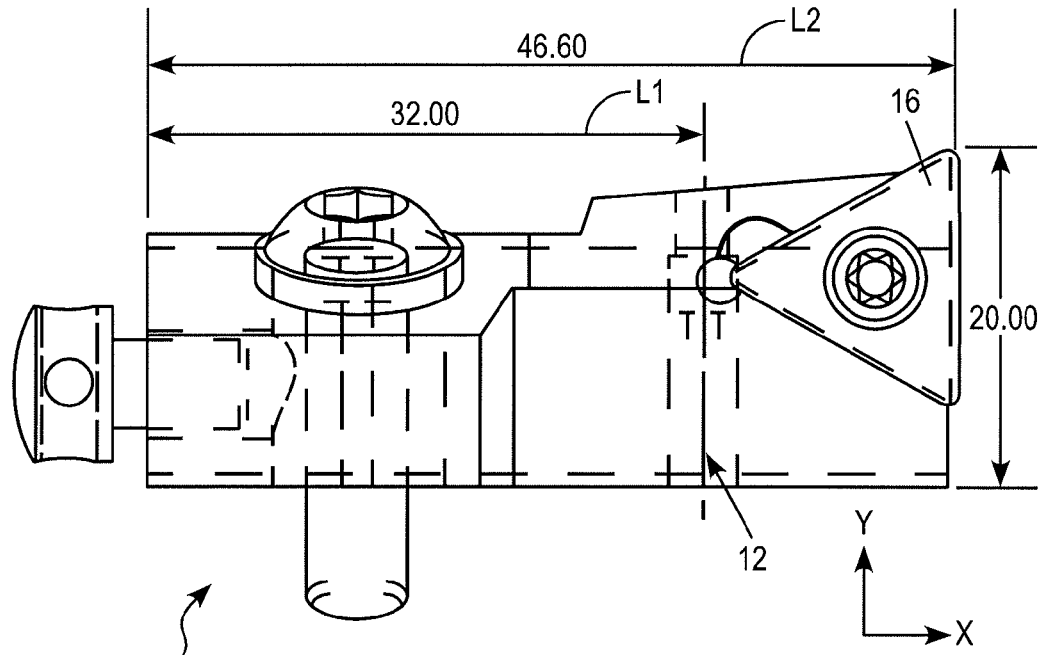
Figure 2:
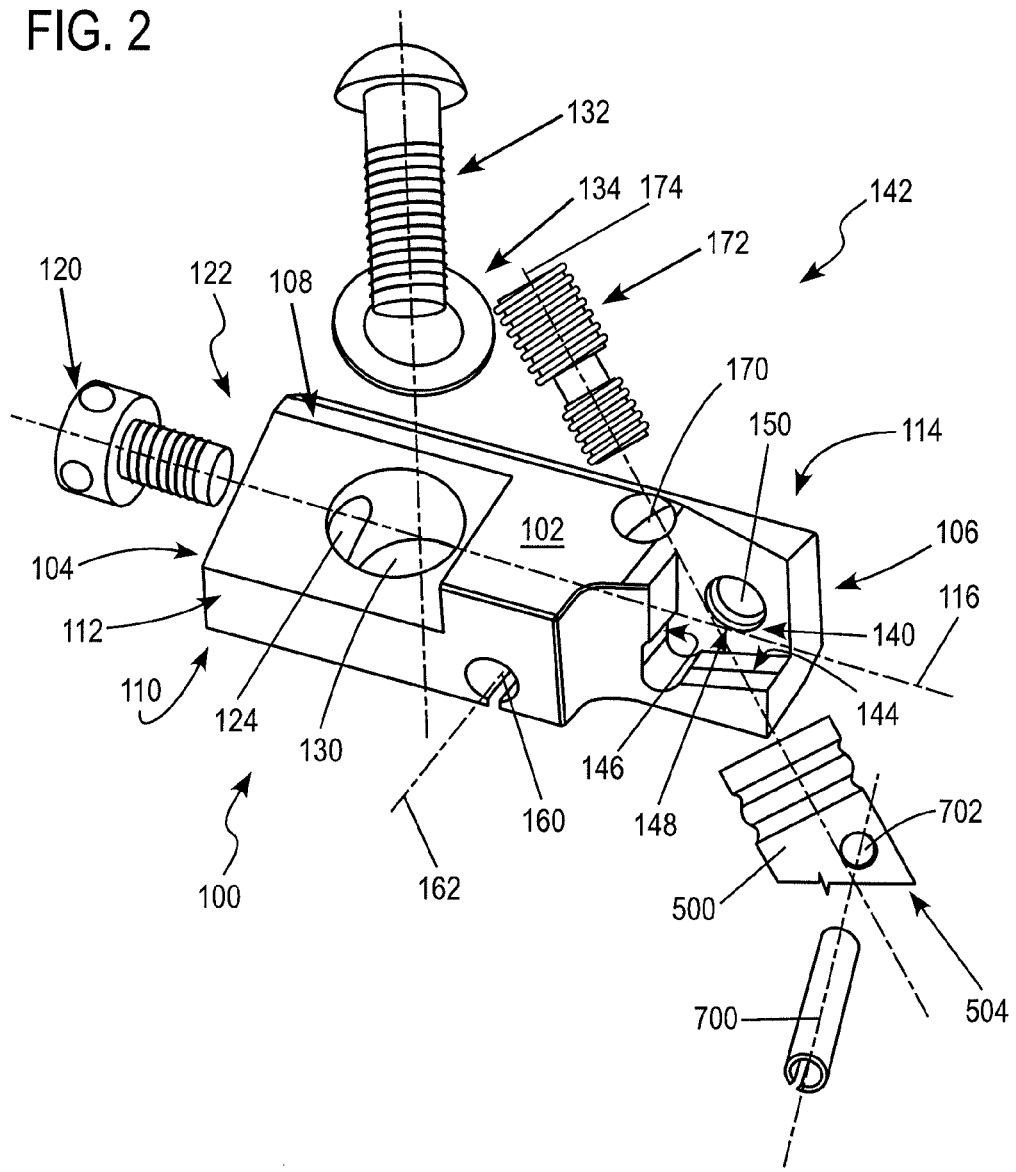
FIG. 2 shows an exploded view of an exemplary embodiment of an tool cartridge for a material removal tool.

FIG. 2 shows an exploded view of an exemplary embodiment of a tool cartridge for a material removal tool 100. The exemplary tool cartridge 100 includes a cartridge body 102. The cartridge body 102 can have any suitable shape. In the illustrated example, the cartridge body 102 is generally rectangular in shape having generally six nominal sides: a first end surface 104 generally opposing a second end surface 106; a top surface 108 generally opposing a bottom surface 110; and a first side surface 112 generally opposing a second side surface 114. The top surface 108; bottom surface 110; first side surface 112; and second side surface 114 generally interconnect the first end surface 104 and second end surface 106 to form a solid body having a long axis 116. The foregoing use of terms and assigning of six surfaces to the cartridge body 102 does not preclude having irregular surfaces, cutout regions or other features on any of the named surfaces while still being generally described as having a general rectangular shape. Examples of such features are further described herein.

Other features of the exemplary tool cartridge 100 include an axial adjustment screw 120 at a first end 122 of the cartridge body 102. In the exemplary embodiment shown in FIG. 2, the adjustment screw 120 is placed in a threaded opening 124 that is open to the first end surface 104. When actuated, the axial adjustment screw transfers the tool cartridge 100 in a transverse direction along axis 116, which in conventional arrangement is the X-axis direction. Generally, an adjustment in direction of axis 116 has no influence on the position in the Y-axis direction of a control point of a cutting insert in the seat of the tool cartridge 100. However, an adjustment in the Y-direction axis will modify position of the control point in the X-axis direction. Thus, it would be generally beneficial to conduct axial adjustment along the X-axis direction following radial adjustment along the Y-axis direction.

Other features of the exemplary tool cartridge 100 also include an opening 130 for a clamping screw 132. In the exemplary embodiment shown in FIG. 2, the opening 130 is proximate the first end 122 of the cartridge body 102 and extends from the top surface 108 to the bottom surface 110. As shown, the top surface 108 in the vicinity of the opening 130 is angled relative to the top surface 108 in other regions of the cartridge body 102. A washer 134 is shown with the clamping screw.

Other features of the exemplary tool cartridge 100 further include a seat 140 for a cutting tool insert (not shown in FIG. 2) at a second end 142 of the cartridge body 102. In the exemplary embodiment shown in FIG. 2, the seat 140 has two surfaces 144,146 to support the flank of the cutting insert and surface 148 to support the bottom surface of the cutting insert. In the surface 148 is an opening 150 to support the mounting mechanism for the cutting tool insert, for example, a threaded fastener.

Additional features of the exemplary tool cartridge 100 include a recess 160. In the exemplary embodiment shown in FIG. 2, the recess 160 extends through at least a portion of the cartridge body 102 from the first side surface 112 toward a second side surface 114. A long axis 162 of the recess 160 is non-parallel to a long axis 116 of the cartridge body 102. At least a portion of the recess 160 is open to the bottom surface 110 of the cartridge body 102.

Further features of the exemplary tool cartridge 100 include a threaded opening 170 for a differential screw 172. In the exemplary embodiment shown in FIG. 2, the threaded opening 170 is proximate the second end 142 of the cartridge body 102 and positioned longitudinally (relative to the long axis 116 of the cartridge body 102) between the opening 130 for the clamping screw 132 and at least a portion of the seat 140. The threaded opening has an axis 174.

Figure 3A:
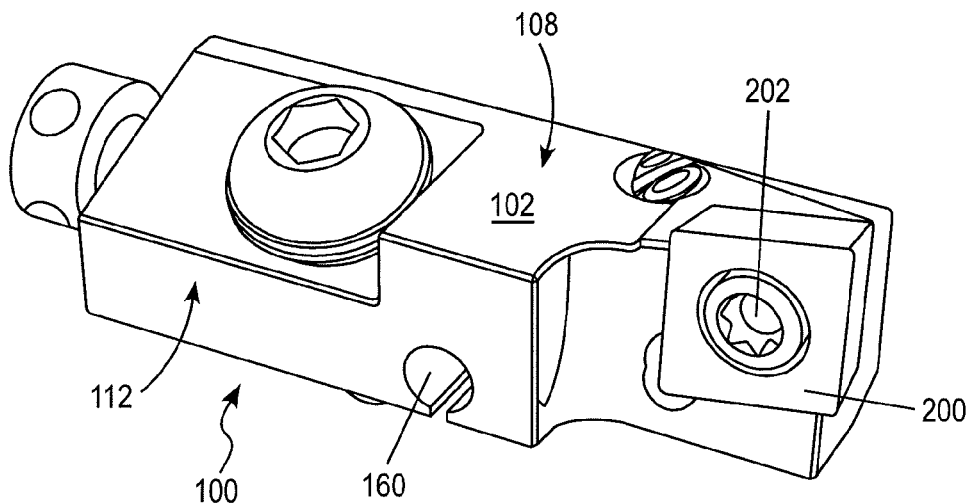
FIGS. 3A to 3C illustrate different views of an exemplary embodiment of an tool cartridge for a material removal tool.
Figure 3B:
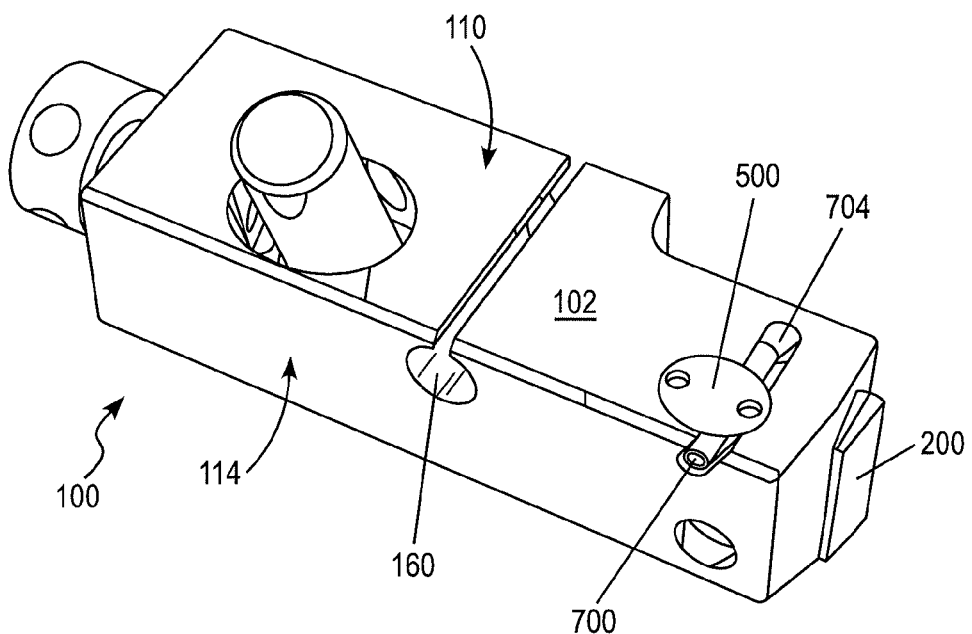
Figure 3C:
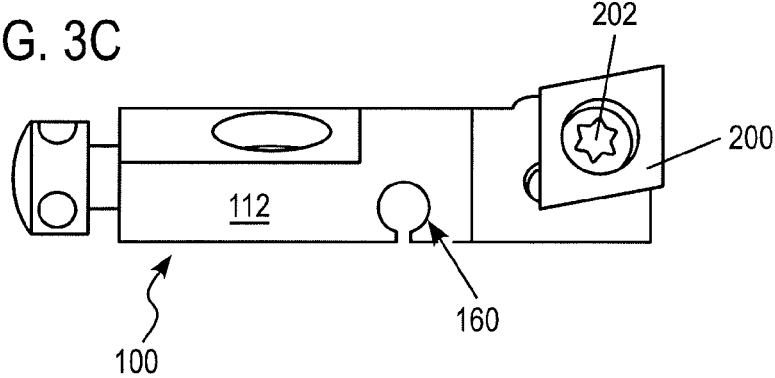

FIGS. 3A to 3C illustrate different views of an exemplary embodiment of an tool cartridge 100 for a material removal tool. FIG. 3A is a top forward perspective view showing primarily the top surface 108 and first side surface 112; FIG. 3B is a bottom back perspective view primarily showing the bottom surface 110 and second side surface 114; and FIG. 3A is a side view showing primarily the first side surface 112. In each of FIGS. 3A to 3C, a cutting tool insert 200 is positioned in the seat 140 and secured by a fastener 202 in the opening 150.

Figure 4A:
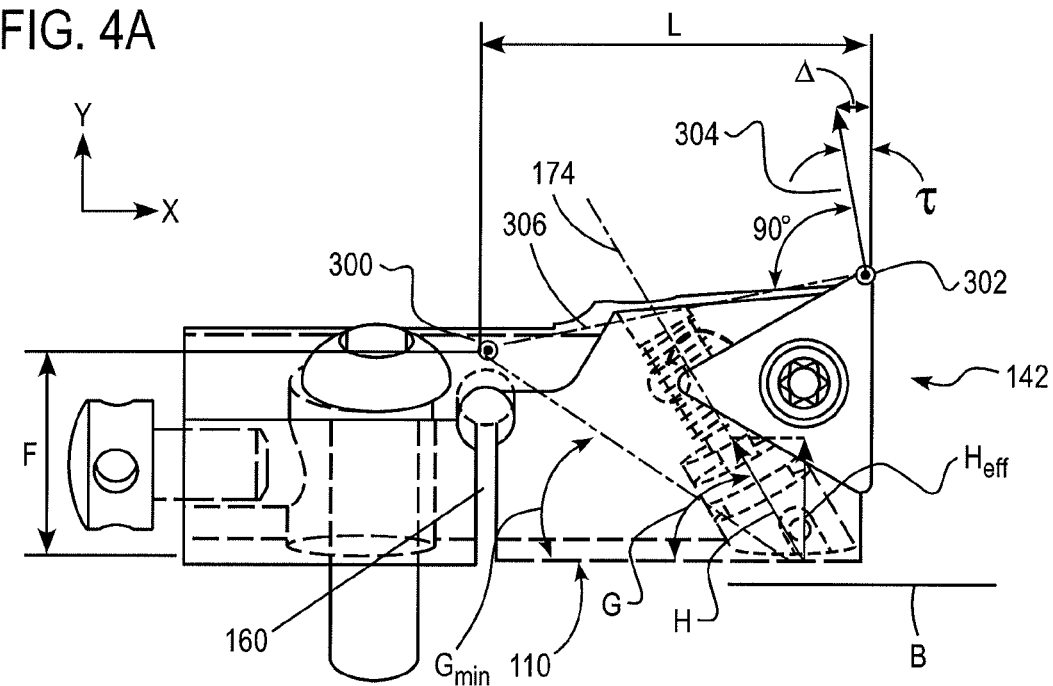
FIGS. 4A and 4B are magnified views including the second end of the cartridge body and showing, among other things, some features internal to the cartridge body and some angular relationships.
Figure 4B:
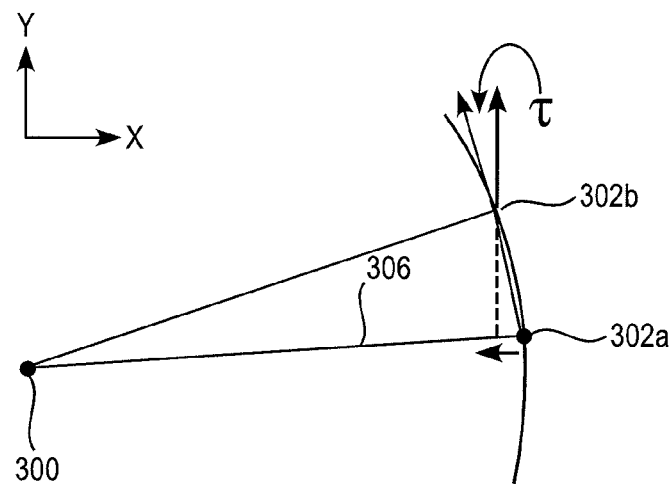

FIG. 4A is a magnified view including the second end 142 of the cartridge body 102 and showing some features internal to the cartridge body 102. In the exemplary embodiment shown in FIG. 4A, the spatial relationships among the orientation of the threaded opening 170, the center of rotation 300 of the cartridge body 102 and the control point 302 of a cutting tool insert 200 positioned in the seat 140 of the tool cartridge 100 are illustrated. In exemplary embodiments, the axis 174 of the threaded opening 170 for the differential screw 172 is at an angle G relative to the axis X. With reference to FIGS. 4A and 4B, the control point 302 of the seated cutting tool insert 200, being on the end of the imaginary radius 306, moves circumferentially during adjustment about the center of rotation 300 (see change in position of control point 302 from a first position 302a to a second position 302b. Radial adjustment of control point 302 will generate an imaginary vector of velocity 304 located on the angle τ relative to the Y-axis. This in turn provides displacement Δ of control point 302 in the axial direction. This is why, as it was mentioned above, axial adjustment screw is beneficially to be used in the end of the adjustment cycle to compensate for the error Δ.

The axis 174, forms angle G to bottom surface 114 of the cartridge body 102. This allows every unitary move in the direction of differential screw axis 174 to be reduced 1/sin(G) times to conform to the following relationship:

$$H_{eff} = H \sin(G)$$

where $H_{eff}$ is the effective adjustment vector of movement, H is the vector of movement of the differential screw 172 (which corresponds to the axis 174).

For an example if G=60 degrees, $H_{eff}$=H (0.866), which results in an adjustment resolution that is 15% more fine than for G=90 degrees. At an angle G of 45 degrees, the improvement in the resolution of adjustment will be 41% more precise. Reduction of angle G towards 0 has geometrical constrains based on the design envelop of the cartridge body. In general $G_{min}$>ATAN (F/L). In exemplary embodiments, 89.9°>G>30°.

By the above relationship and positions, the differential screw 172 functions as a differential wedge mechanism and imparts finer control to the adjustment of the position of the cutting tool insert 200 on the material removal tool. For example, the angle G positions the features of the translating mechanism such as differential screw 172 and other associated components so that the vertical movement (i.e., in the Y-axis direction) relative to a baseline B of the second end 142 of the tool cartridge body 102 (and any associated cutting tool insert mounted thereon) per a thread length of the differential screw 172 is reduced. This results in smaller vertical movement and finer incremental control of the position of those portions of the tool cartridge.

Figure 5A:
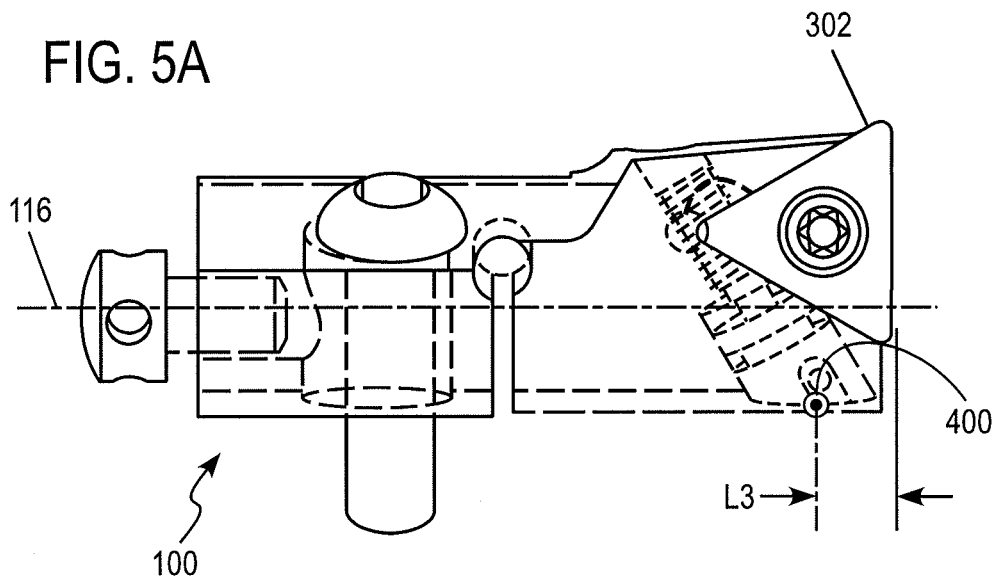
FIGS. 5A and 5B show the spatial relationship between the adjustment support point and the control point in exemplary embodiments of the tool cartridge.
Figure 5B:
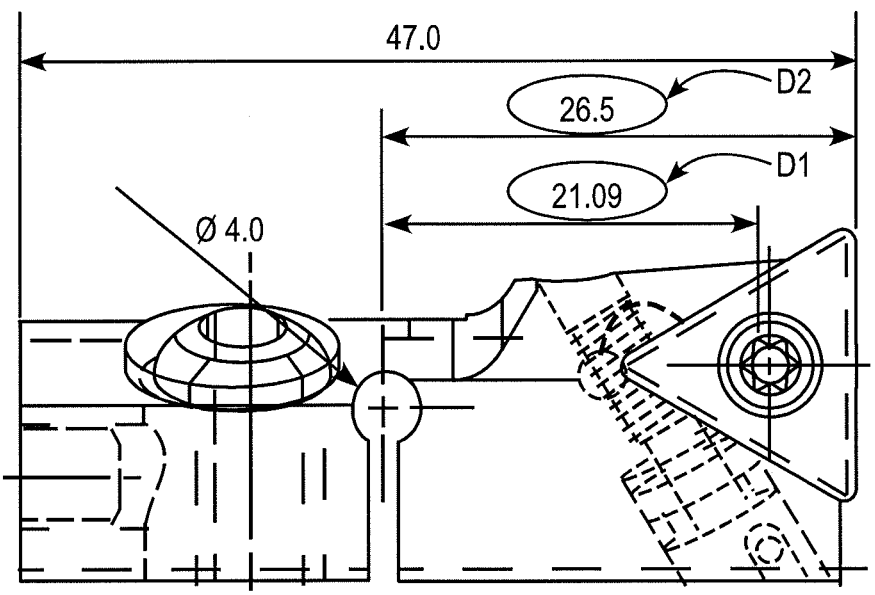

FIGS. 5A and 5B show the spatial relationship between the adjustment support point 400 and the control point 302 in exemplary embodiments of the tool cartridge 100. Employing an angle for the axis 174 of differential screw 172 moves an adjustment support point 400, i.e., the point at which the forces of the differential screw 172 are asserted against the baseline B, typically a part of the material removal tool such as the cavity housing the tool cartridge, closer in the X-axis direction along axis 116, to the control point 302. For example, distance L3 in FIG. 5A is less than the correlating distance in the conventional "screw down" tool cartridge FIG. 5B is a schematic drawing of a portion of a material removal tool. FIG. 5B presents real-world examples of values for the distance from the center of rotation 300 to the adjustment support point 400 (D1, which equals 21.09 mm in the example) and from the center of rotation 300 to the control point 302 (D2, which equals 26.5 mm in the example). In comparison with known art for a STFCR-12CA-16M cartridge, the distances illustrated in FIG. 5B result in an improvement in resolution of 14%.

Another aspect of the disclosed tool cartridge is that incorporating both the flexibility of the tool cartridge body 102 about center of rotation 300 due to the recess 160 and the control functions of the differential wedge mechanism allows significant reduction in stresses generated in the clamping screw 132 and in the threads of differential screw 172.

Figure 6:
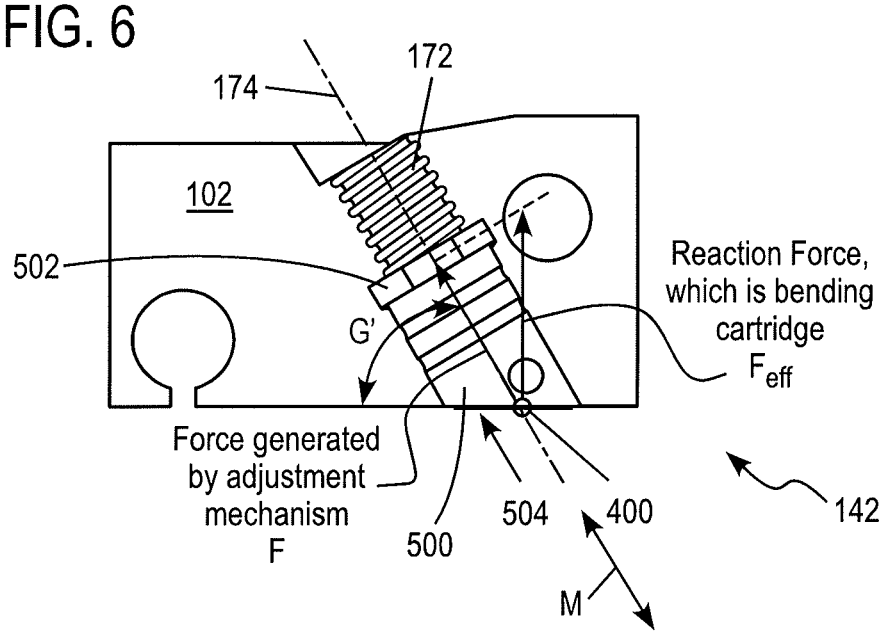
FIG. 6 is another magnified view including the second end of the cartridge body and showing some features internal to the cartridge body.

For example, a still further feature of the exemplary tool cartridge 100 includes a pad 500 positioned in the threaded opening 170 for the differential screw 172 at the bottom surface 110 of the cartridge body 102. This feature can be seen in, for example, FIGS. 2 and 3B. With reference to FIG. 6, which is another magnified view including the second end 142 of the cartridge body 102 and showing some features internal to the cartridge body 102, the exemplary pad 500 has a wedge-like shape and is in operative communication with the differential screw 172 at a first end 502 to translate motion of the differential screw 172 to change a protrusion position of a surface 504 of the pad 500 relative to the bottom surface 110 of the cartridge body 102. The translation motion is illustrated by arrows M in FIG. 6.

In exemplary embodiments, differential screw 172 has an external thread of pitch P1 on a first threaded portion located at one end and is positioned in an angle-based threaded opening 170 of cartridge body 102. The other end of the differential screw 172 has a second threaded portion with an external thread of pitch P2 and of the same lead and is engaged with internal threads of a first threaded portion of pad 500, which has pitch P1.

The use of different pitches can provide increased resolution of adjustment without specifying non-standard threads. If only metric or only imperial threads are used for both ends of the differential screw, resolution of adjustment will be relatively coarse as difference between pitches of threads. For example, if one end is standard M10×1.5 and fine pitch is M10×1.25, than the difference in pitches is 1.5−1.25=0.25 mm. As a result, one turn of the differential screw will adjust the position of the reference point on the insert about 0.25 mm. In contrast, if standard m10×1.5 thread would be combined with standard ⅜"-16 thread (pitch=25.4 mm/16=1.5875 mm) the difference of the pitches will be 1.5875−1.5=.0875 mm. This is 2.9 times finer (or more precise) than the prior situation and provides increased resolution of adjustment.

When the differential screw 172 is turned, it moves into and out of the threaded opening 170. This translation motion along axis 174 generates a force F, which acts through the pad 500 on the adjustment support point 400 and generates a reaction force $F_{eff}$. This reaction force $F_{eff}$ causes the cartridge body 102 to bend and generates stresses, for example on the clamping screw 132. In this respect, the shape of pad 500 provides a reduced applied force F that bends the tool cartridge 102 in accordance with following equation:

$$F = F_{eff} \sin(G)$$

For G=60 degrees, the reduction in force is 15%.

In another aspect, the surface 504 of the pad 500 has a large radius. This large radius reduces contact stress and deformations by converting point contact to the linear contact, which, in turn, will increase longevity of cartridge 100 components.

Figure 7:
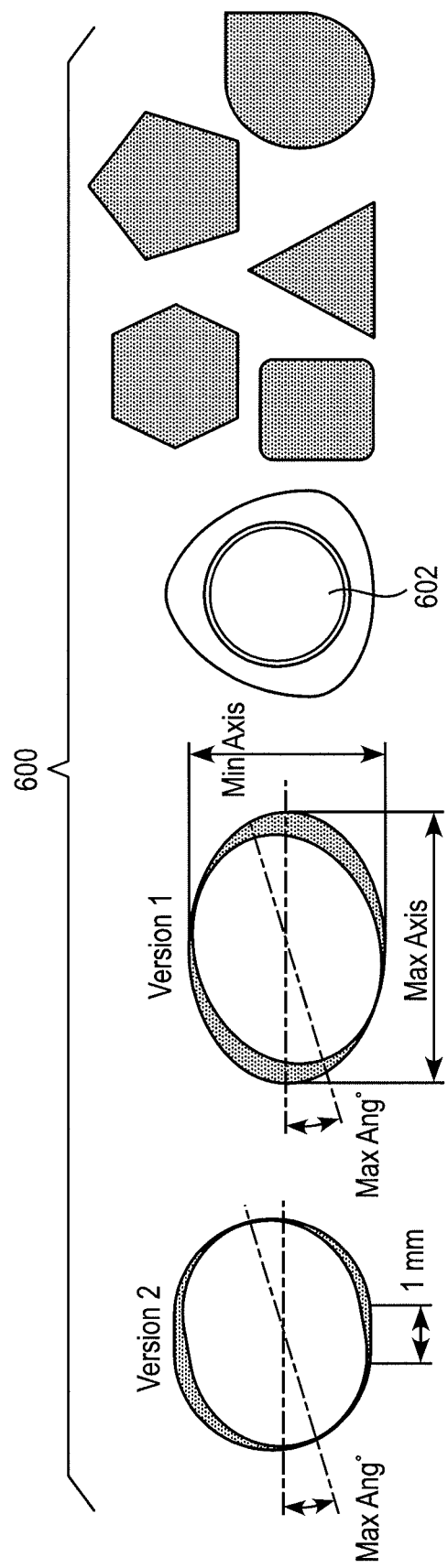
FIG. 7 shows several potential cross-sectional shapes of the pad that can have inherent anti-rotation characteristics.

The pad 500 can be secured in the opening 170 to be non-rotating. For example and as shown, for example in FIGS. 2 and 3B, the pad 500 is positioned for non-rotation by a pin 700 inserted in an opening 702 in a body of the pad 500 and in a slot 704 of the cartridge body 102. The pin 700 can be of the spring style or solid style or other suitable style. Also for example and as shown in FIG. 7, the cross-sectional shape of the pad 500 can be made of a geometric shape 600 with inherent anti-rotation characteristics. In a further embodiment, a cross-sectional shape of at least a portion of a body of the pad 500 can be shaped to inhibit rotation of the pad 500.

A logo or other identifying information can be incorporated onto the surface 504 of the pad 500. For example, the pad 500 or a portion thereof, including the surface 504, can be manufactured of extruded polygon with cross-section style of any known polygon or other shapes which transfer torque or prevent rotation upon their native shape. An example of an anti-rotating shape can be a tri-lobe shape 602, with or without a printed logo, such as that for Coromant Capto®.

Figure 8:
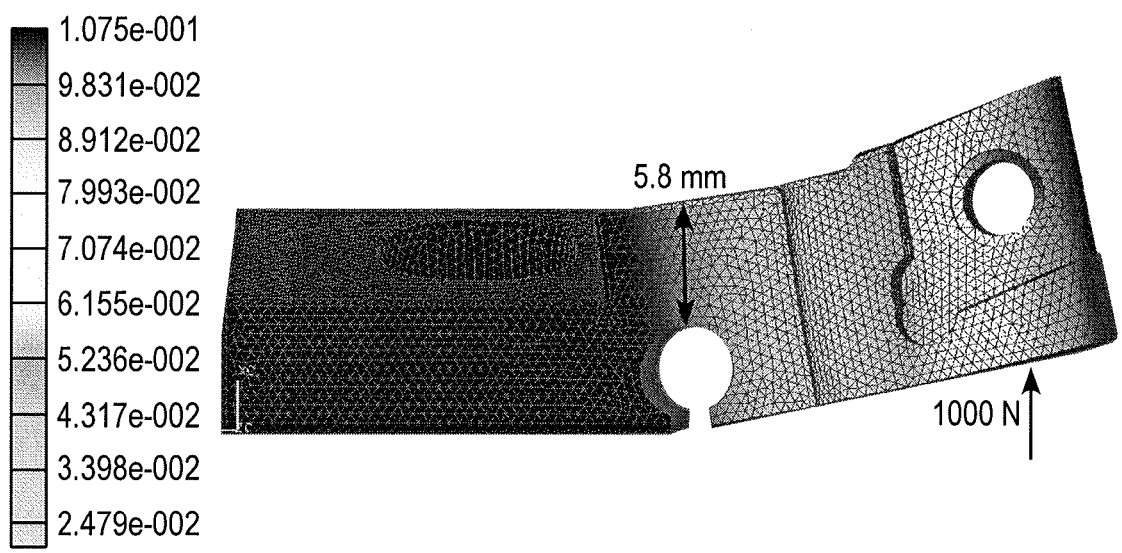
FIG. 8 is an example of an FEA analysis of the stress states in an exemplary embodiment of a cartridge body.

The recess 160 contributes to the flexibility of the cartridge body 102. Suitable parameters to size and locate the recess 160 can be developed using Finite Element Analysis (FEA). FIG. 8 is an example of the stress states in a cartridge body 102 in an FEA analysis. An example of a suitable location for the recess has previously been shown in, for example, FIG. 5B.

Figure 9:
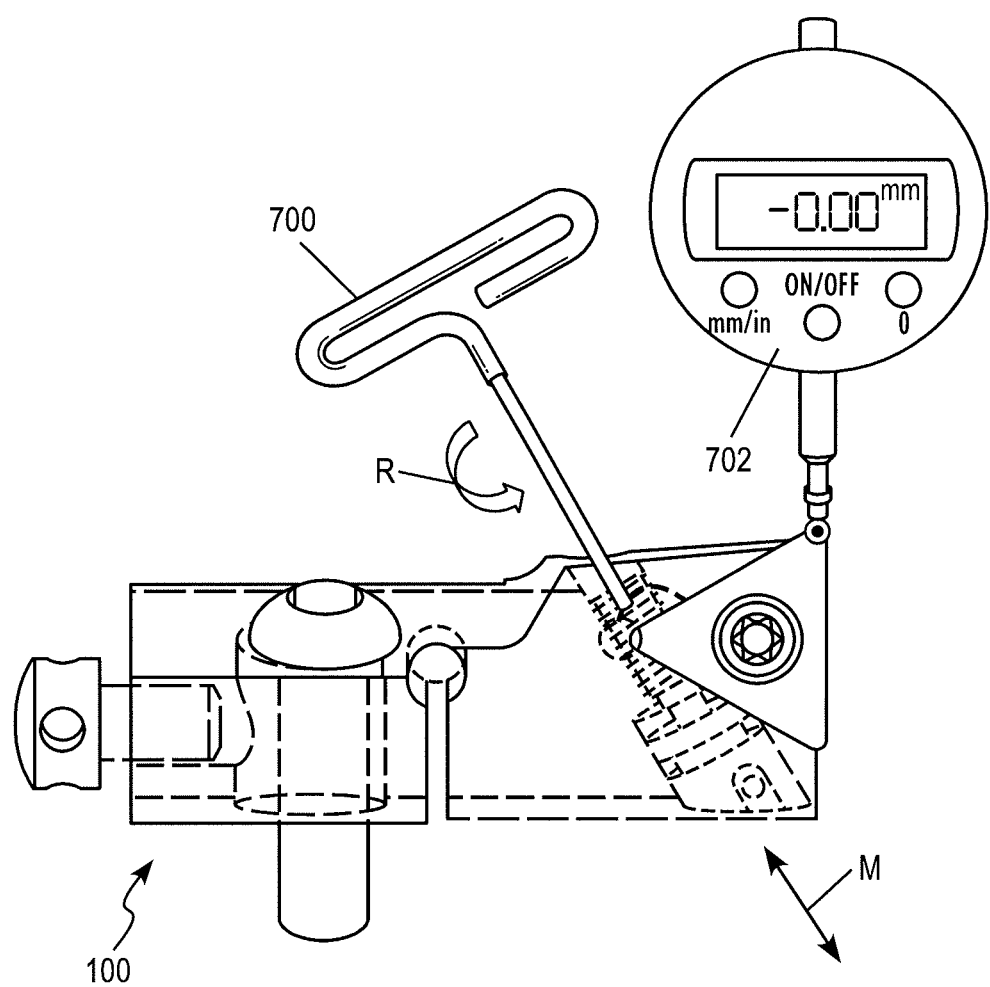
FIG. 9 shows the adjustment of the differential screw using a suitable tool.

FIG. 9 shows the adjustment of the differential screw 172 by rotation R using a suitable tool 700. Suitable tools include, for example, a T-wrench or an Allan wrench. A dial 702 can be used to determine the position of the cutting tool insert 200, such as by determining the position of the control point 302.

Figure 10A:
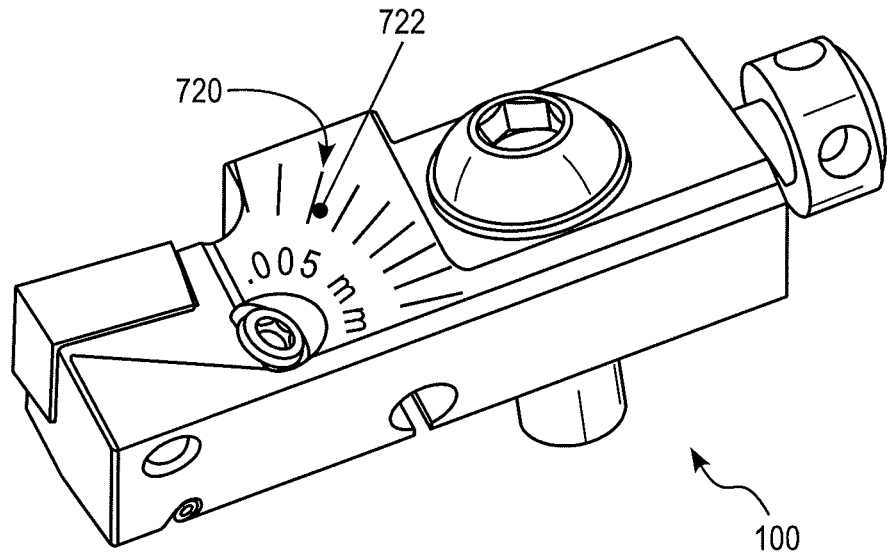
FIGS. 10A-B and 11A-B collectively show other techniques to adjust the differential screw.
Figure 10B:
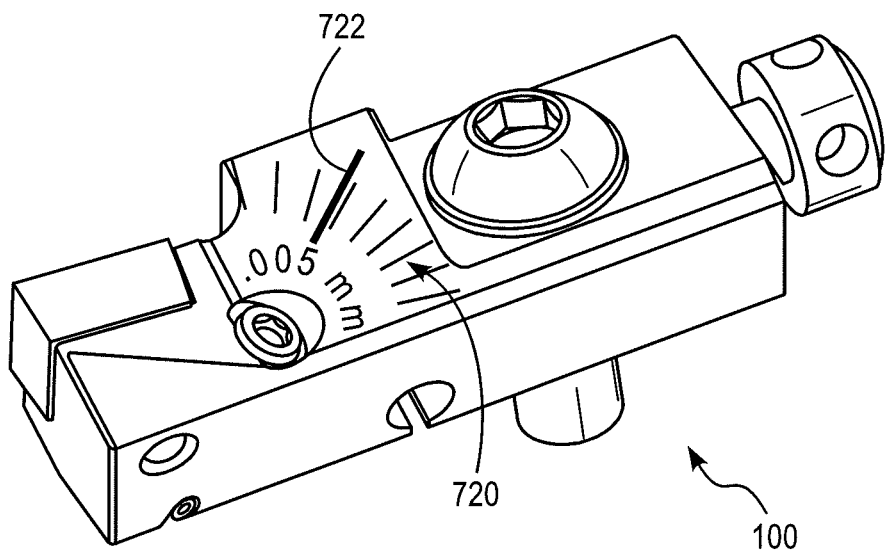
Figure 11A:
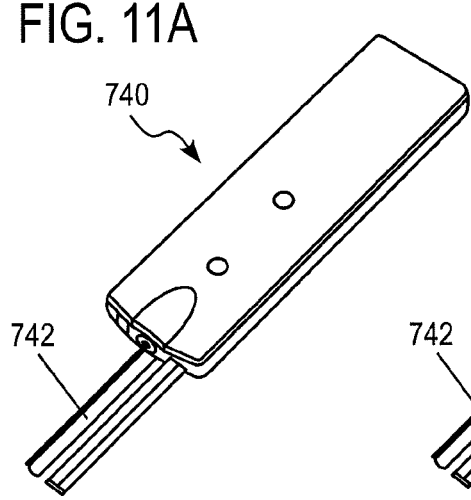
Figure 11B:
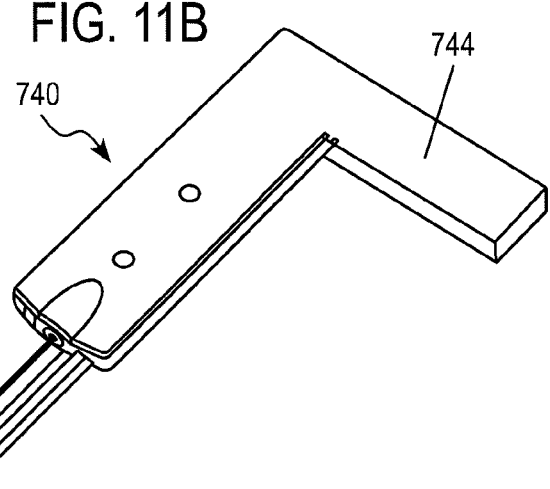

FIGS. 10A-B and 11A-B collectively show other techniques to adjust the differential screw 172. For example and as seen in FIGS. 10A and 10B, marks 720 may be placed on the surface of the cartridge body 102. The marks may be placed there by etching, printing, or other suitable techniques. An example location for marks 720 is in the vicinity of the threaded opening 170, but any suitable location can be used. By using marks 720 in the vicinity of the threaded opening 170, a light projection device, such as a laser beam 722 or other pointing device, can be incorporated into the adjustment of the differential screw 172 that will allow a user to turn the differential screw 172 while also using the marks 720 to determine the position of the differential screw 172 or the amount of rotation imparted to the differential screw 172. Marks 720 can be calibrated to a translation of a reference feature of the tool cartridge 100 or an insert 200 mounted on the tool cartridge 100, such as the control point 302, a top surface 108, or other suitable reference feature by which a position of the control point 302 can be determined. FIGS. 11A and 11B show two variations of a driver or wrench 740 by which to adjust differential screw 172 and which incorporate a laser beam 722 for use with the marks 720. The variation shown in 11B incorporates an extension 742, which provides leverage while turning the differential screw 172.

The tool, such as driver or wrench 740, including a light projection device, such as laser beam 722, can be used to adjust a control point 302 of a cutting tool insert mounted in a tool cartridge 100. To do so, one can rotate the differential screw 172 with the tool 740 to position light from the light projection device with reference to one or more of the plurality of marks 720 on the surface of the cartridge body 102.

Figure 12:
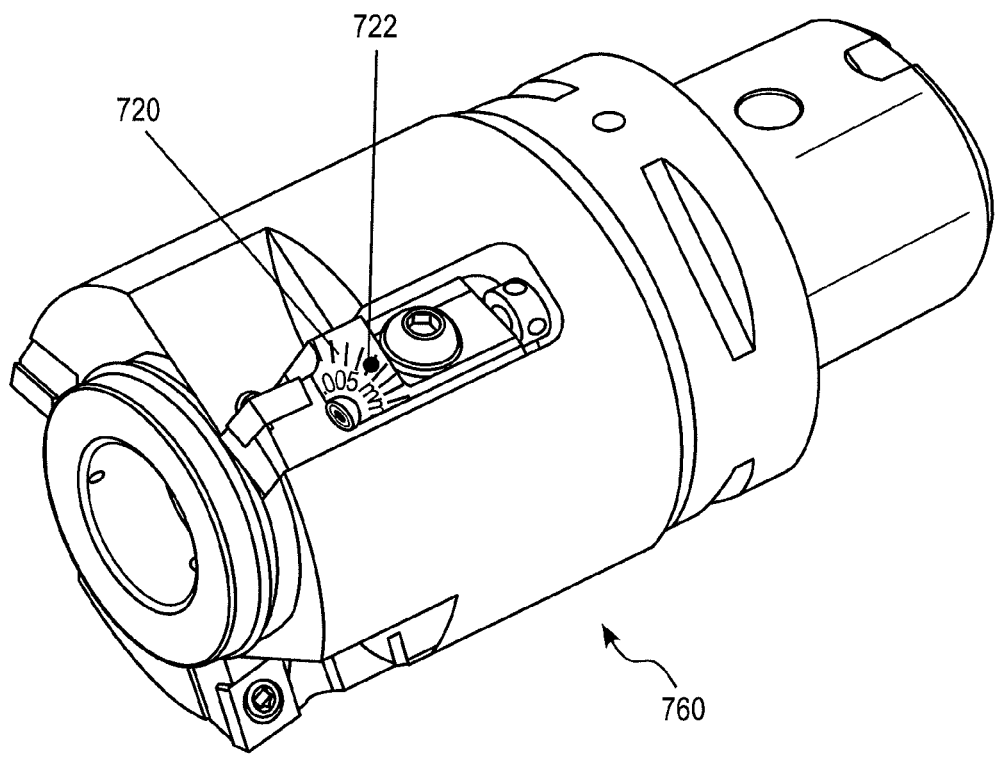
FIG. 12 shows an exemplary embodiment of material removal tool with a plurality of tool cartridges incorporated therewith.

FIG. 12 shows an exemplary embodiment of a material removal tool 760 which incorporates a tool cartridge 100 having marks 720 as disclosed herein. An example of a laser beam 722 on the marks 720 is also shown.

Figure 13:
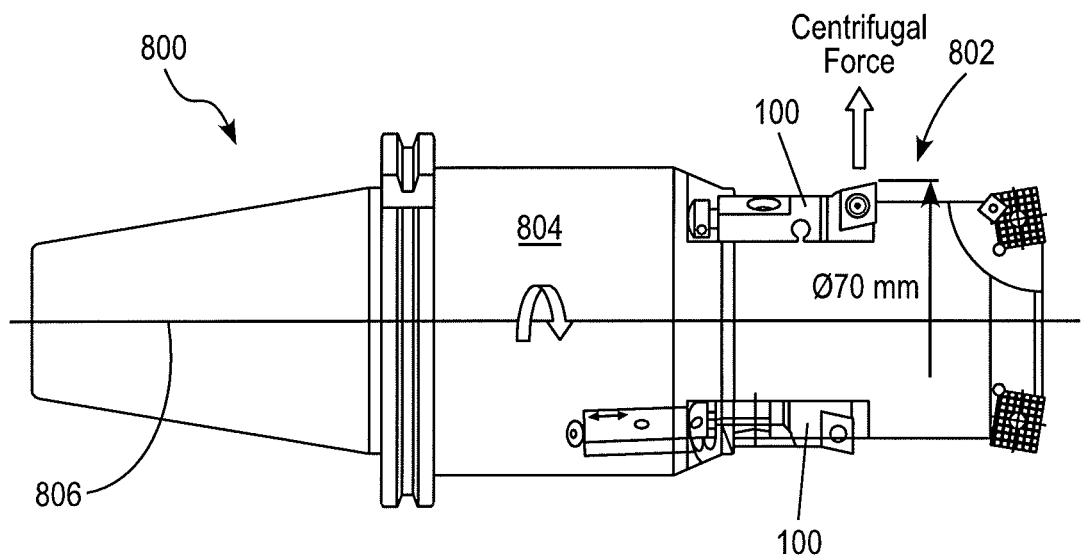
FIG. 13 shows another exemplary embodiment of material removal tool with a plurality of tool cartridges incorporated therewith.

In another aspect, centrifugal force can be considered for the fine adjustment of the tool cartridge 100. FIG. 13 shows a material removal tool 800 with a plurality of tool cartridges 100 incorporated therewith on a bore section 802 of the body 804. The material removal rotates about axis 806 at a spindle speed during machining operations. During machining operations of, for example, non ferrous materials such as aluminum with diamond cutting edge, a speed of rotation can exceed 7000 m/min. For relatively small diameters of boring heads this may convert to high RPM's. Centrifugal force F is proportional to $N^2$ (see equation below):

$$F = 0.01097 M\, R\, N^2$$

where M=the mass in kg, R=radius of center of mass in meters and N=rpm.

Figure 14:
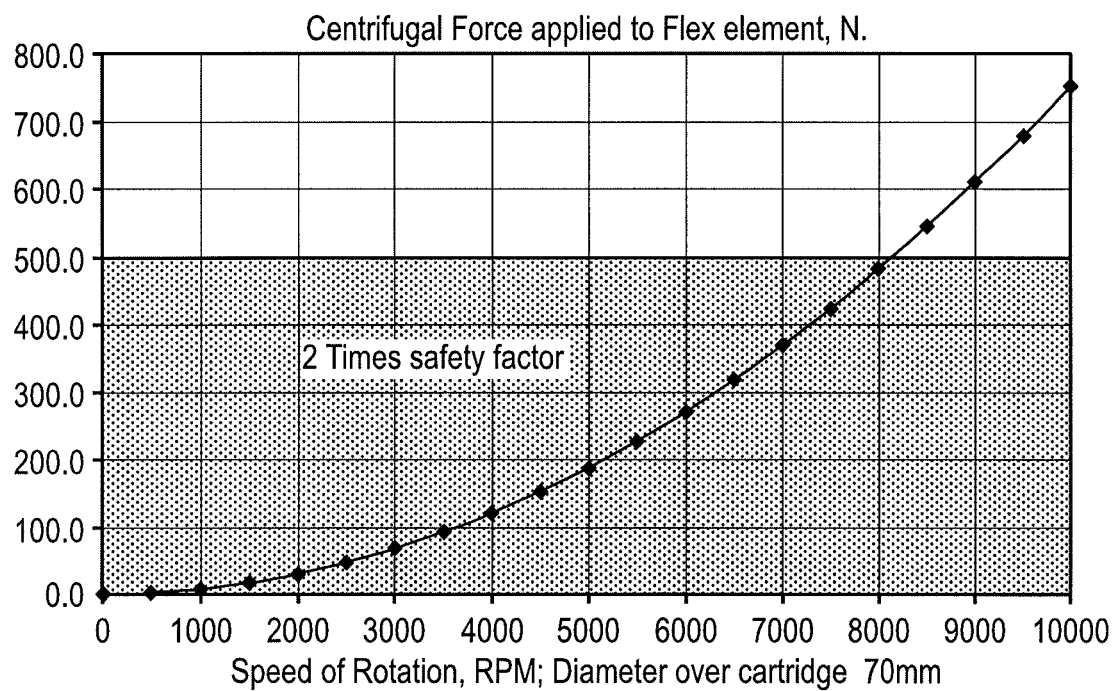
FIG. 14 illustrates results from an engineering calculation performed on an example material removal tool.

Using this information, an engineering calculation was performed on an example material removal tool—a boring bar of diameter Ø70.0 mm. The results of these calculations are shown in FIG. 14 and reveal that safe operation (based on a 2 times safety factor) can be achieved up to a spindle speed of 8000 rpm.

Although described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A tool cartridge for a material removal tool, comprising:
 a cartridge body;
 an axial adjustment screw at a first end of the cartridge body;
 an opening for a clamping screw proximate the first end of the cartridge body;
 a seat for a cutting tool insert at a second end of the cartridge body;
 a recess extending through at least a portion of the cartridge body from a first side toward a second side, a long axis of the recess non-parallel to a long axis of the cartridge body and at least a portion of the recess open to a bottom surface of the cartridge body; and
 a threaded opening for a differential screw proximate the second end and positioned, relative to a long axis of the tool cartridge, longitudinally between the opening for the clamping screw and at least a portion of the seat,
 wherein a thread axis of the threaded opening for the differential screw is at a non-perpendicular angle G relative to the long axis of the tool cartridge and intersects the bottom surface of the cartridge body at a non-perpendicular angle,
 wherein the threaded opening for the differential screw extends from a first opening in a top surface of the cartridge body to a second opening in the bottom surface of the cartridge body,
 wherein, relative to the long axis of the cartridge body, the first opening is axially closer to the opening for the clamping screw than the second opening and the second opening is axially closer to the second end of the cartridge body than the first opening, and
 wherein the long axis of the recess is positioned, relative to the long axis of the cartridge body, longitudinally between the threaded opening for the differential screw and the opening for the clamping screw.

2. The tool cartridge of claim 1, wherein the cartridge includes a pad positioned in the threaded opening for the differential screw at the bottom surface of the cartridge body.

3. The tool cartridge of claim 2, wherein the pad is in operative communication with the differential screw at a first end to translate motion of the differential screw to change a protrusion position of a surface of the pad relative to the bottom surface of the cartridge body.

4. The tool cartridge according to claim 2 or 3, wherein the differential screw has a first threaded portion with an external thread of pitch P1 and a second threaded portion with an external thread pitch of P2, wherein the pad has a first threaded portion with an internal thread pitch P2, and wherein the second threaded portion of the differential screw is engaged with the first threaded portion of the pad.

5. The tool cartridge of claim 2, wherein the pad is positioned for non-rotation by a spring pin inserted in an opening in a body of the pad and in a slot of the cartridge body.

6. The tool cartridge of claim 2, wherein a cross sectional shape of at least a portion of a body of the pad inhibits rotation of the pad.

7. The tool cartridge of claim 1, wherein the angle G is greater than or equal to 30 degrees and less than 90 degrees.

8. The tool cartridge of claim 1, including a plurality of marks on the cartridge body, wherein the marks are calibrated to a translation of a reference feature of the tool cartridge or an insert mounted on the tool cartridge.

9. The tool cartridge of claim 8, wherein the reference feature is a control point.

10. The tool cartridge of claim 8, wherein the reference feature is the top surface of the cartridge body.

11. A material removal tool, comprising:
a body; and
a plurality of tool cartridges according to claim 1.

12. A tool for rotating a differential screw of a tool cartridge for a material removal tool, the tool cartridge including a cartridge body, an axial adjustment screw at a first end of the cartridge body, an opening for a clamping screw proximate the first end of the cartridge body, a seat for a cutting tool insert at a second end of the cartridge body, a recess extending through at least a portion of the cartridge body from a first side toward a second side, a long axis of the recess non-parallel to a long axis of the cartridge body and at least a portion of the recess open to a bottom surface of the cartridge body, and a threaded opening for the differential screw proximate the second end and positioned, relative to a long axis of the tool cartridge, longitudinally between the opening for the clamping screw and at least a portion of the seat, wherein a thread axis of the threaded opening for the differential screw is at a non-perpendicular angle G relative to the long axis of the tool cartridge and intersects the bottom surface of the cartridge body at a non-perpendicular angle, wherein the threaded opening for the differential screw extends from a first opening in a top surface of the cartridge body to a second opening in a bottom surface of the cartridge body, wherein, relative to the long axis of the cartridge body, the first opening is axially closer to the opening for the clamping screw than the second opening and the second opening is axially closer to the second end of the cartridge body than the first opening, and wherein the long axis of the recess is positioned, relative to the long axis of the cartridge body, longitudinally between the threaded opening for the differential screw and the opening for the clamping screw, the tool including:
a tool body;
means for engaging the differential screw for rotating the differential screw about a screw axis; and
a light projection device.

13. A method of adjusting a control point of a cutting tool insert mounted in a tool cartridge according to claim 8, the method comprising:
rotating the differential screw with a tool including a light projection device; and
positioning light from the light projection device with reference to one or more of the plurality of marks on the surface of the cartridge body.

14. The tool for rotating of claim 12, wherein the tool body includes a plurality of marks on a surface of the tool body, wherein the marks are calibrated to a translation of a reference feature of the tool cartridge or an insert mounted on the tool cartridge, and wherein the light projection device projects light on or near the plurality of marks.

15. The tool for rotating of claim 12, wherein, relative to the long axis of the tool cartridge, a portion of the threaded opening for the differential screw axially overlaps a portion of the seat for the cutting tool insert.

16. The tool for rotating of claim 12, wherein the portion of the recess open to the bottom side of the cartridge body mouths in the bottom surface of the cartridge body axially between the opening for the clamping screw and the threaded opening for the differential screw.

17. The tool cartridge of claim 1, wherein, relative to a short axis of the tool cartridge, the threaded opening for the differential screw is axially offset from the seat for the cutting tool insert.

18. The tool cartridge of claim 1, wherein the portion of the recess open to the bottom surface of the cartridge body mouths in the bottom surface of the cartridge body axially between the opening for the clamping screw and the second opening of the threaded opening for the differential screw.

19. The tool cartridge of claim 1, wherein, relative to the long axis of the cartridge body, the first opening is axially separated from the seat for the cutting tool insert and the second opening defines an adjustment support point that axially overlaps a portion of the seat for the cutting tool insert.

20. The tool cartridge of claim 19, wherein, relative to the long axis of the cartridge body, the adjustment support point is proximate an opening in the seat to support a mounting mechanism for the cutting tool insert.

* * * * *